United States Patent [19]

Cummings

[11] Patent Number: 4,527,703
[45] Date of Patent: Jul. 9, 1985

[54] FLEXIBLE STERILE CLOSURE SYSTEM FOR CONTAINERS

[75] Inventor: Robert Cummings, Richardson, Tex.

[73] Assignee: U.S. Clinical Products, Inc., Richardson, Tex.

[21] Appl. No.: 540,637

[22] Filed: Oct. 11, 1983

Related U.S. Application Data

[63] Continuation of Ser. No. 386,021, Jun. 7, 1982, Pat. No. 4,423,819, which is a continuation-in-part of Ser. No. 294,331, Aug. 19, 1981, Pat. No. 4,390,104.

[51] Int. Cl.³ ............................................. B65D 41/32
[52] U.S. Cl. .................................................. 215/232
[58] Field of Search ..................... 215/232, 254, 249; 383/5; 156/69

[56] References Cited

U.S. PATENT DOCUMENTS

| | | |
|---|---|---|
| 1,916,977 | 7/1933 | Gutmann . |
| 2,876,775 | 4/1959 | Barr, Sr. et al. . |
| 2,878,808 | 3/1959 | Broman . |
| 3,064,652 | 11/1962 | Corcoran et al. . |
| 3,391,847 | 7/1968 | Christine et al. . |
| 3,463,339 | 8/1969 | McGuckin . |
| 3,501,042 | 3/1970 | Risch et al. . |
| 3,637,102 | 1/1972 | Shaw . |
| 3,712,498 | 1/1973 | Lawrence . |
| 3,788,374 | 1/1974 | Mitsuaki . |
| 3,904,060 | 10/1975 | McPhee . |
| 3,921,630 | 11/1975 | McPhee . |
| 4,006,839 | 2/1977 | Thiel et al. . |
| 4,131,211 | 12/1978 | Corbic . |
| 4,209,126 | 6/1980 | Elias . |
| 4,266,687 | 5/1981 | Cummings . |
| 4,318,490 | 3/1982 | Schneider . |

FOREIGN PATENT DOCUMENTS

| | | |
|---|---|---|
| 201082 | 10/1955 | Australia . |
| 500032 | 2/1954 | Canada . |
| 2753239 | 7/1979 | Fed. Rep. of Germany . |
| 2922047 | 12/1979 | Fed. Rep. of Germany . |

OTHER PUBLICATIONS

American Journal of Hospital Pharmacy, pp. 162-163 (vol. 37 #2, Feb. 1980).
American Journal of Hospital Pharmacy, pp. 632-633 (vol. 37 #5 May 1980).
"EM'ETTES" Unit Dose Packaging System handout.
Pharmacy Stock Label handout (date unknown).
American Journal of Hospital Pharmacy, p. 1257 (vol. 35 #10, Oct. 1978).
American Journal of Hospital Pharmacy, pp. 453-454 (vol. 36 #4, Apr. 1979).

*Primary Examiner*—Donald F. Norton
*Attorney, Agent, or Firm*—Richards, Harris, Medlock & Andrews

[57] ABSTRACT

A sealing cover has an upper layer of plastic film substantially impervious to moisture and bacteria. A second layer of metal foil film is bonded to the plastic layer with a layer of adhesive or by extruding the plastic onto the second layer. An additional layer of adhesive material is bonded to the second layer for adhering to a carrier liner in packaging the seal and engaging the container top in resealing the container upon removal from the carrier. Upon removal of the sealing cover from a container, telltale strips of the cover are left in engagement with the container to indicate the seal has been removed. In another embodiment, a layer of metal foil is laminated between two layers of plastic film. Slits may be formed in the cover to promote its tearing to leave telltale sealing strips on the container upon removal of the cover. In another embodiment, a single layer of metal foil substantially impervious to moisture and bacteria includes a layer of adhesive material for an adhesive-coated surface for resealing the top of a container.

9 Claims, 22 Drawing Figures

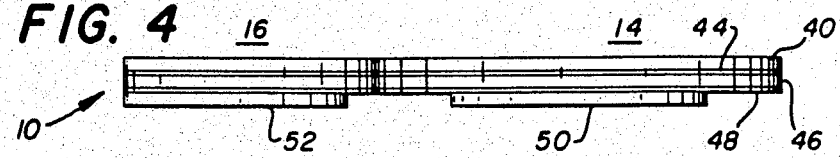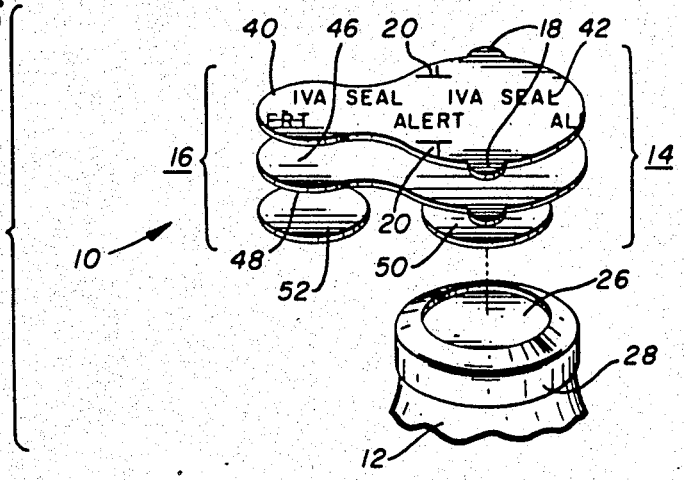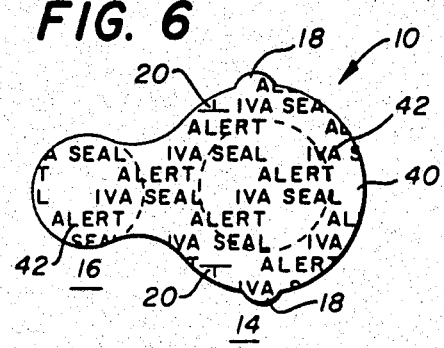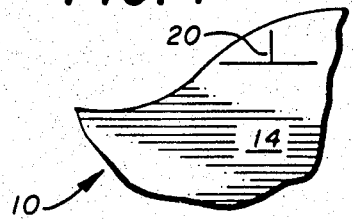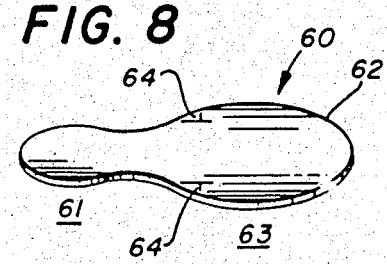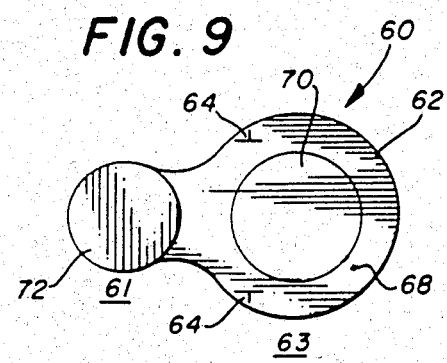

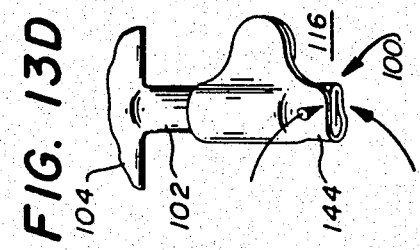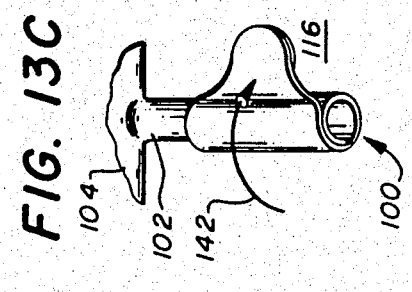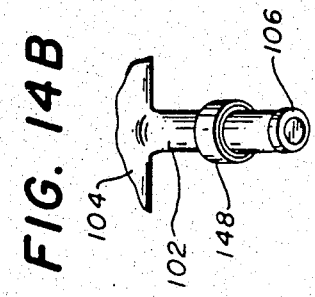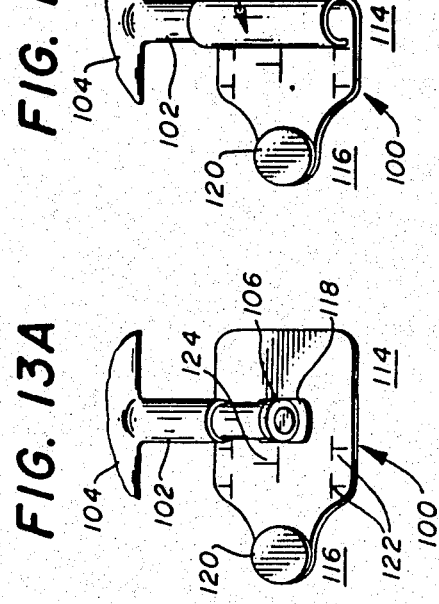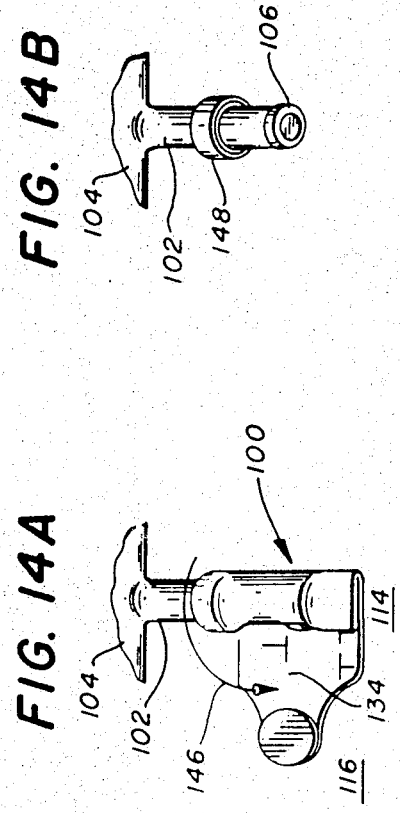

FLEXIBLE STERILE CLOSURE SYSTEM FOR CONTAINERS

This is a continuation of application Ser. No. 386,021, filed June 7, 1982, now U.S. Pat. No. 4,423,819, which is a continuation-in-part application of application Ser. No. 294,331, filed Aug. 19, 1981, now U.S. Pat. No. 4,390,104.

TECHNICAL FIELD

This invention relates to an article and method for resealing an intravenous pharmaceutical container, and more particularly to a thin film seal for resealing a pharmaceutical container.

BACKGROUND ART

Intravenous (IV) additive and injectable unit dose programs are administered in many hospitals as one method for introducing medications into a patient for a prescribed treatment. In prescribing an IV additive or an intramuscular medication unit dose treatment program, a doctor may order any one of a number of drugs or vitamins to be injected intramuscularly or added to the solution in a sterilized IV container and administered intravenously to a patient. The quantity of the drug or vitamin is also prescribed by the doctor to adjust the dosage of medication to the intravenous solution to the needs of each patient. In addition to the method of adding drugs and vitamins to an IV container for an IV additive program, some IV additive programs may be instituted by combining an IV additive solution in a "piggyback" arrangement of containers for certain specialized treatments requiring a combination of drugs.

In a hospital's IV additive program, the prescribed medication is added to an IV bottle or plastic IV bag by inserting a needle into the "target area" of a membrane closing the top of an IV solution bottle or a membrane covering the inlet port of a plastic IV bag. The IV solution bottle has a sterile seal covering the membrane area prior to the time of adding medication to the bottle. The IV bottle must be resealed under sterilized conditions to prevent airborne bacteria, such as Pseudomonas Aeruginosa, from accumulating on the exposed surface of the IV bottle covering. In addition to maintaining a sterile surface of a bottle, the resealing of the bottle alerts the hospital staff that the original contents have been altered by the Pharmacy and have not been altered since then. A hospital's nursing staff is trained not to administer the IV solution unless one of the members of the staff mixed the contents, or there is some means to alert the nursing staff that the contents have not been altered since they were prepared in the Pharmacy department. In the case of the plastic IV bag, the sealing cover protects the "plug" in the inlet port from becoming dislodged during storage or transport, and the cover also alerts the Pharmacy that the contents have not been altered so the container and its contents may be reissued to another patient.

The prior practice has been to utilize a plastic cap for resealing the IV containers. The plastic cap for the bottle container snaps over the top of the metal rim surrounding the rubber membrane to completely cover and seal the top of the solution bottle. For the IV bags, the prior practice uses a plastic cap or a heat shrink plastic wrap to reseal the plastic IV bag's inlet port. The seal for the IV bag is seldom removed, since a separate outlet is used for administering the drugs to the patient. However, in those instances when it is necessary to remove the inlet port seal the plastic cap sometimes must be fractured. In removing the plastic cap, the rubber plug in the inlet port may be dislodged, breaking the sterility barrier and requiring the hospital to discard the IV bag.

In an effort to hold down hospital costs in reducing the allocation for expensive inventory space, the prior practice of most hospitals has attempted to maintain only one size plastic cap in inventory for IV bottles and another one for IV bags. Since the IV solution and piggyback containers are manufactured by different manufacturers, the tops are not of uniform diameter. The plastic caps do not provide the necessary sterilized seal in resealing the IV containers if there is not a tight mechanical closure over the container top. As a result of the tight fit required between the plastic cap and a metal seal of a bottle, the nursing staff often faces a problem in attempting to separate the plastic cap from the metal rim. The nursing staff often must resort to using expensive surgical instruments or scissors, which can be damaged, to help them in prying off the plastic sealing cap. The difficulty of removing the plastic caps from IV containers has resulted in some hospitals issuing pliers to the nursing staff to remove the caps. Removal of plastic caps or resealing intravenous containers has resulted in the inefficient use of the services of skilled personnel, such as registered nurses, in attempting to remove container closures. More importantly, many of the prior art closures and methods for sealing IV solution bottles do not allow a nurse inspecting a container without a sealing cover to know where it was removed, if another drug was added, if it was previously resealed, or how the drugs were added. In such a situation, rather than risk exposing the patient to a serious infection from harmful bacteria which may have accumulated on the top of such a container, or risk harm from any tampering with the container, the nurse must often reject the container which results in wasting the medication as well as a delay in administering the medication to a patient while additional medication is reordered from the Pharmacy department.

The present hospital practice does not normally include removing the plastic cap or heat shrink plastic wrap applied to the inlet port of an IV bag. Unlike the IV bottle, a separate outlet port is provided for connecting the container intravenously to the patient. The reentry into an inlet port that has become contaminated pushes contamination back into the bag. However, the difficulties encountered in reentering the inlet port with prior resealing techniques often result in the loss of the entire container and its contents on those occasions when it is either desirable to change the dosage of the medication or the unit is not used and is returned to the Pharmacy department. As the medication in the container may be quite expensive, this represents a substantial loss to the hospitals.

On May 12, 1981, U.S. Pat. No. 4,266,687 issued to the inventor of the present invention for a sealing cover and method for resealing an intravenous container. The invention covered by that patent was an improvement over the prior practice of resealing IV bottles with molded plastic caps. The present invention offers even further improvements, including the improvement in the flexibility of the cover in conforming and adhering to such a container, and yet a cover with a plastically deformable film which enhances the adherence of the seal to a metal rim of an IV bottle or the port of an IV bag. The present invention also represents an improvement in the method of resealing plastic IV bags.

The flexible cover in one embodiment is made from multiple layers of thin film wherein at least one layer is a plastically deformable material which retains its physical shape on the metal rim or IV bag, such as a metal foil film material. The flexibility of the cover enables one size cover to accommodate manufacturers' variations from the standard sized container top. In another embodiment, a single layer of thin plastically deformable film material is used for the cover.

DISCLOSURE OF THE INVENTION

The apparatus and method of the present invention is an improvement over the above-described prior art apparatus and methods for sealing IV solution containers. It alerts the hospital staff that the content of an IV container has been altered in the pharmacy department, and it provides a tamper proof seal. In one embodiment of the present invention, an effective seal is constructed with multilayered flexible plastic and plastically deformable materials. In another single layer embodiment an effective seal is constructed with a flexible plastically deformable material, such as a thin film of metallic foil. The cover is a professional appearing sealing cover with flexibility for conforming to the contour of the various sized and shaped container tops. The laminated construction of sealing materials and bonding systems results in a flexible seal which may be packaged on a specially coated carrier liner, substantially reducing the inventory space required by the hospital for storing the present type of IV additive container closures.

In one embodiment of the present invention, the multi-layered structure of the improved sealing cover includes at least one flexible layer substantially impervious to moisture and bacteria and at least one other layer of a plastically deformable material, such as a metallic foil, that tends to conform to and retain the shape it is placed in on the container and does not tend to return to its original flat shape upon the carrier liner. The multiple layers of material may be bonded together by layers of adhesive to form a laminate, or the multiple layers may be joined by extruding a plastic material onto a plastically deformable material. A layer of adhesive is applied to one major surface to contact the container opening or port, and a non-adhesive region is formed within the adhesive region where the cover will overlie the rubber membrane of the IV container. The non-adhesive area may be formed by adding a disk, or providing a coating of ink, lacquer or other chemical material as a means for separating the adhesive from the rubber membrane of the container top. In another embodiment, the adhesive material may be printed or applied by any other suitable means to create a pattern of adhesive to adhere to the container top without contaminating or contacting the rubber member. The area of adhesive material, normally an annular ring for an IV container top, is exposed upon removal of the cover from a carrier liner for placement over the top of the "target area" of the container top and brought into contact with the surrounding metal rim by slight pressure applied by the palm of the hand. A pull-tab may be joined to the generally circular shaped container closure for removing the closure from the specially coated carrier liner, aligning the closure with its center over the "target area" of the container top, and removing the closure from the container to leave a telltale strip on the metal rim as verification that the seal was applied in Pharmacy. The pull-tab may have a non-adhesive backing for ease in handling. Slits may be provided in the cover to further promote the tearing of the cover on removal to leave a strip of material on the container. A tamperproof feature causes the seal to destruct upon removal to prevent a used non-sterile seal from being reapplied on that container or reused on another container top, as well as to reduce the chances of someone inadvertently resealing a container so it would appear to be still in its original sterilized condition.

In another embodiment, a single layer of plastically deformable material that is also impervious to moisture and bacteria, such as a metallic foil film, may be utilized to fabricate the closure. An adhesive layer is applied to one major surface of the closure for adhering to the container surface to be sealed.

In yet another embodiment, a layer of plastically deformable material with poor memory characteristics, e.g., metallic foil film, is laminated between two layers of plastic film or a coating material such as lacquer. The multiple layers may be joined or bonded together with an adhesive or formed by extruding a plastic material onto each side or major surface of the layer of the plastically deformable material. In either case, an adhesive layer is applied to the surface of the plastic layer to be the bottom of the closure for attachment to the container top. The multi-layered seal also inhibits curling of the seal when removed from its carrier liner.

In addition to the above stated advantages, the improved flexible seal of the present invention may also include some indicia, such as printing, to identify the sealed container, e.g., a code to identify a requirement for refrigeration or to improve the detection of the telltale strips left on the container top. The printing may be on the upper surface of the top layer, reverse printing on the back side of the top layer, or printing onto a second layer where the first layer is transparent. The layer of foil material may also be color coded to identify the contents of the container, the hospital department where the container is used or some similar type of information. In addition, indicia relating to the container to which the seal is to be attached may include adding a dye material to the adhesive material joining the layers to provide a means for color coding the seals.

In another embodiment of the present invention, an improved sealing cover is used in resealing a plastic IV solution bag. It has a multi-layered structure as described above and a layer of adhesive material with a defined non-adhesive region. The non-adhesive region may be provided with one or more disks or a coating of ink, lacquer or other material or by pattern printing of an adhesive material. The non-adhesive region keeps the adhesive from the rubber plug closing the inlet port, helps to align the cover with the plug, and keeps the adhesive from causing the plug to dislodge upon removal of the seal. The area of adhesive material is exposed upon removal of the cover from a carrier liner for wrapping it around the neck of the inlet port or for folding it together over the top of the inlet port. The edge of the cover extending beyond the rubber plug is closed upon itself by pinching to seal the inlet port. A pull-tab may be included to facilitate placement and removal of the cover. Slits may be provided in the cover to further promote leaving a strip of material on the container upon removal, or slits may prevent tampering with the container by causing the seal to destroy upon its removal.

BRIEF DESCRIPTION OF DRAWINGS

For a more complete understanding of the present invention and the advantages and features thereof, reference is now made to the accompanying Detailed Description taken in conjunction with the following figures in which:

FIG. 4 is an enlarged side view, illustrating the lamination of layers and bonding systems of the preferred embodiment of the present invention;

FIG. 5 is an enlarged exploded view of the laminated structure of the sealing cover of the present invention positioned above an IV solution container top;

FIG. 6 is a top view of the preferred embodiment of the present invention;

FIG. 7 is a partially cutaway enlarged view of the slit formed in the sealing cover;

FIG. 8 is an enlarged perspective view of a single layer plastic sealing cover of the present invention;

FIG. 9 is a bottom view of the single layer plastic sealing cover of FIG. 8;

FIGS. 13A-D illustrate the steps in resealing the inlet port of a plastic IV container;

FIGS. 14A-B illustrate the steps in removing the sealing cover of the present invention from the inlet port of a plastic IV container;

DETAILED DESCRIPTION

Figure 1:
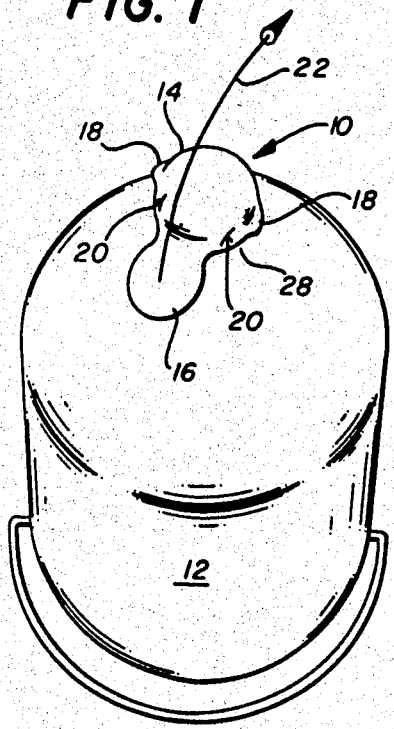
FIG. 1 is a perspective view of an IV solution container resealed with a flexible seal of the present invention.

FIG. 1 illustrates the sealing cover of the present invention, generally identified by the reference numeral 10. The sealing cover 10 is shown securely in place and conforming to the top of an IV solution container 12. The sealing cover 10 includes a generally circular cover area 14 joined to a pull-tab section 16 for affixing and removing the cover 10. The cover area 14 may also include protrusions 18 extending from opposite edges of the cover area 14 for promoting the secure attachment of the cover 10 to the container 12. Of course, the sealing covers 10 may also be secured to the container without the addition of protrusions 18, e.g., see FIG. 8. The cover 10 has separation slits 20 formed on opposite sides of the cover area 14 to promote the separation of the cover 10 upon its removal from the container 12 to leave telltale strips of material along two sides of the container top. The separation slits 20 are shown as "T-shaped" but may consist of a straight slit or even multiple slits in a straight line along the tear line. The direction in which the pull-tab 16 is pulled to remove the cover 10 is generally indicated by the arrow 22.

Figure 2:
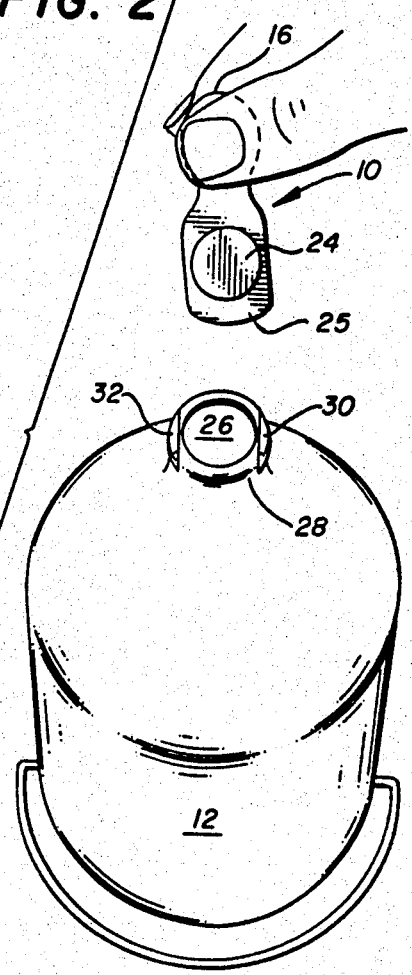
FIG. 2 is a perspective view of the IV solution container FIG. 1, illustrating the strips of the sealing cover adhering to two sides of the metal rim upon removal of the sealing cover.

FIG. 2 illustrates the IV solution container 12 and sealing cover 10 of FIG. 1 after the removal of the cover 10. FIG. 2 also illustrates the nonadhesive region 24 within an adhesive annular ring 25 on the side of the cover 10 next to the "target area" 26 of the container top 28. The telltale strips 30 and 32 remain in place on the container top 28 and indicate that the sterilized seal has been broken. Upon removal of the sealing cover 10, the IV solution container 12 is ready for a member of the nursing staff of a hospital to insert a needle or an IV spike in an IV administrative set through the rubber membrane "target area" 26 to begin the administration of an IV additive solution in the container 12 to the patient. The cover area 14 may be the same size as the outside diameter of the metal rim 28, or it may extend over the edges, as shown in FIG. 1.

Figure 3:
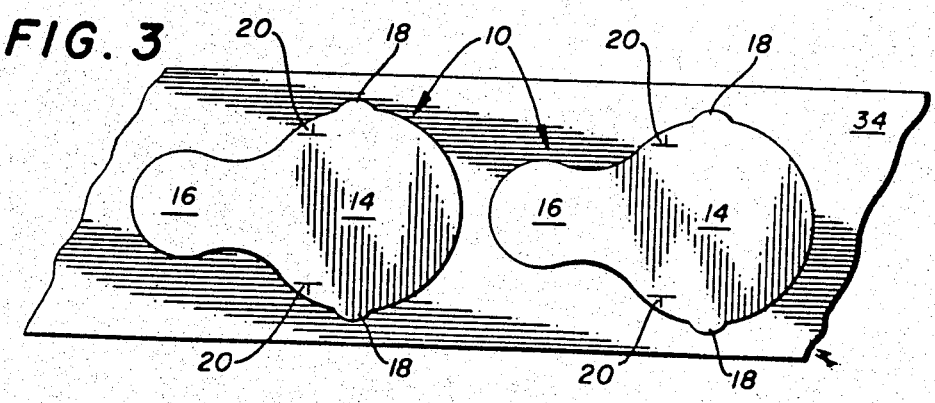
FIG. 3 is a top view of two sealing covers of the present invention packaged upon a strip of specially coated carrier liner.

FIG. 3 is a top view of two sealing covers 10 packaged upon a strip of carrier liner 34. The liner 34 has been coated with controlled release chemicals to allow the adhesive annular ring 25 to adhere to it for packaging purposes, yet allow the adhesive ring 25 to be separated from the liner 34 without causing the cover 10 to separate. The sealing covers 10 may be packed upon a continuous strip of carrier liner 34 and rolled into a spiral ring for use in a flat cardboard container for dispensing individual sterilized sealing covers 10. The improved sealing covers 10 of the present invention may be packaged in bulk on the carrier liners 34, requiring approximately only 10% of the storage space previously required for the molded plastic resealing caps of the prior art.

FIGS. 4 and 5 illustrate the laminated structure of one embodiment of the sealing cover 10. An upper layer 40 of the cover 10 may be formed from a material generally impermeable to bacteria and moisture, e.g., a thermosetting plastic, such as polypropylene, polystyrene, polyester, polyethylene or other plastic. The plastic film has a desired thickness of between 0.00025 to 0.003 inches. In one embodiment a 0.00092 inch thick polyester film has proven satisfactory. The upper layer 40 may be imprinted with a message 42 which could provide information concerning the IV additive solution as well as promote the visibility of the telltale strips 30, 32 left on the container top 28 upon separation of the cover 10. The printing on layer 40 may be on the upper surface with an alcohol resistant ink or reverse printed on the opposite side of layer 40. A layer of adhesive material 44 is applied to one surface of the upper layer 40 which is to be mated with a second layer of foil film 46. The foil film layer 46 may be formed from metallic foil, such as aluminum foil having a desired thickness of between 0.00025 and 0.003 inches. The commercial acceptable grades of metallic foil which may be used are the following: (a) dead soft foil, (b) half hard foil and (c) full hard foil. The tempering of the foil determines the grading of these various types of foil film. The layers 40 and 46 may also be bonded together as an extruded laminate wherein the foil film layer 46 has a desired thickness in a range of 0.00025 to 0.003 inches. In one cover 10 of this embodiment, an aluminum foil film 0.00035 has proven satisfactory. The second layer 46 of foil film provides the plastically deformable characteristic to the cover without losing the flexibility to conform to the container top 28. The second layer 46 even allows the cover 10 to retain its shape on a metal rim 28 that has been swabbed with alcohol. The flexibility provided in the upper layer 40 of plastic film and second layer of foil film 46 allows for a standard sized sealing cover 10 to be provided with an enlarged cover area 14 which still remains flexible enough to conform to the shape of large and small container tops 28. The foil film has the characteristic of plastic deformation to retain the seal 10 in its deformed shape around the metal rim 28 of the container 12 (see FIG. 1). Indicia relating to the contents of the container 12 to which the seal 10 is applied may also include printing on the foil film layer 46. Indicia may also be applied by color coding the seal 10 by the use of a color coded foil or plastic film or by the addition of a dye material to the adhesive layer 44. Of course, where the indicia is applied to the second layer 46 or adhesive layer 44 the upper layer 40 is transparent.

In another embodiment, the sealing cover 10 may be constructed with the upper layer 40 made from foil film and joined or bonded to a second layer 46 made from a plastic film, e.g., an acrylic plastic, polypropylene or polystyrene. The sealing cover 10 of this embodiment has the same desirable characteristics as noted above.

In either of the above-described embodiments (whether the plastically deformable material is the first or second layer) a second layer of adhesive material 48 is applied to the surface of the second layer 46 to engage the container top 28. In order to prevent the adhesive material 48 from contacting the "target area" of a membrane 26 of the container top 28, a disk 50 is bonded to the adhesive layer 48. The disk 50 may be coated with a release material, e.g., silicone, to promote its separation from the carrier liner 34. Similarly, a disk 52 is bonded to the adhesive 48 in the pull-tab region 16 to keep the adhesive material 48 covered. The disks 50 and 52 may be made from a polystyrene or other material, and the disk 50 may be made from a material, e.g., polystyrene, to enhance telltale puncture marks in the plastically deformable material of layer 46 to indicate if the contents of the IV container have been altered since it left the Pharmacy department.

Another means for forming a non-adhesive region upon adhesive layer 48 is a chemical sealant, such as an ink solution or lacquer material, applied to the central region of the adhesive layer 48 to seal the adhesive 48 from contacting the rubber membrane 26. In addition, the adhesive layer 48 may be applied with patterned printing of the adhesive to leave the desired area free of adhesive material.

FIG. 6 illustrates a top view of a sealing cover 10 with two "T shaped" separation slits 20 formed in the upper plastic layer 40 to further promote the separation of materials upon removal of the cover 10 from a container top 28 to leave the telltale strips 30 and 32. Of course, the slits 20 may be a single slit on each side of tab section 16. As illustrated in the enlarged partially cutaway view of a cover 10 in FIG. 7, the separation slits 20 are formed in the cover region 14 such that the edges of the slits 20 do not extend to the edge of the cover 10. The slit 20 is set back from the edge of the cover 10 to reduce the likelihood of tearing the sealing cover 10 when removing it from the carrier liner 34.

In use, the sealing cover 10 is manufactured under clean conditions and attached to a chemically treated carrier liner 34 to retain the sterility of the cover 10 during storage prior to its use. The strip of carrier material 34 may be rolled and placed in a dispensing carton (not shown), and the cartons may be packaged in plastic bags. The bags containing the package seals 10 are sterilized by using ethylene oxide gas to meet the current sterility standard of the U.S. Pharmacopoeia (U.S.P. No. 19). Of course, the strip of carrier liner 34 with attached sealing covers 10 may be packaged in any suitable configuration desiged for ease in dispensing the sealing covers 10, and it may be sterilized by any means meeting the current sterility standards of the U.S. Pharmacopoeia.

In a normal hospital IV additive program, the original sealing cover for the IV solution container 12 (or intramuscular injectable vials) installed by the manufacturer is removed by a nurse or other hospital personnel under procedures prescribed for maintaining sterile conditions. The prescribed medication is then added to the IV solution in container 12 under a sterile hood or similar hospital condition for maintaining a sterile work environment. The medication may be added to a full bottle or to a piggyback bottle, or a diluent may be added to a bottle to reconstitute a powdered drug.

Medication is introduced into the container 12 by puncturing the rubber membrane 26 with a transfer system, such as a syringe containing a controlled quantity of the prescribed medication or an IV transfer needle or IV additive vials or other medication transfer devices. Upon release of the medication into solution the syringe is withdrawn. A sterile sealing cover 10 is then withdrawn from its dispenser and removed from the special carrier liner 34 by means of the pull-tab 16. The polystyrene disk 50 or other area of the cover 10 aligned with the "target area" rubber membrane 26 remains in a sterile condition until removal from the carrier liner 34. A disk 50 is positioned over the rubber membrane 26, and the annular ring 25 of adhesive material 48 is brought into engagement with the container top 28 by slight pressure from the palm of the hand. In order to ensure a complete fit, the protrusions 18 may be pressed against the metal container top 28. The pull-tab region 16 may also be pressed downward to insure the adhesive material 48 in the annular ring 25 adjacent the pull-tab 16 is brought into engagement with the container top 28. The top or bottom of the sealing cover 10 may include an imprinted code for identification purposes, such identification as the identity of the drug added to the IV solution, or any other information which may be desired by the user. In addition, the foil film, either first layer 40, adhesive layer 44 or second layer 46, may be color coded to indicate information concerning the contents or the department of the hospital which is to handle and administer the container 12.

The sterile seal of the resealed IV container 12 is not broken until the nursing staff is ready to administer the IV solution to the patient. The sealing cover 10 may be removed by hand, without using any instruments, such as pliers or scissors, which are often required now in removing plastic resealing caps. The pull-tab 16 of a sealing cover 10 is pulled upwards in the direction generally indicated by the arrow 22 of FIG. 1 in order to properly remove the cover 10 from the container 12. In those embodiments with slits 20, the slits facilitate the beginning of the separation of the cover 10 to leave the two telltale sections 30 and 32 still attached to the container top 28. The telltale material left on the metal rim alerts the hospital staff that the sterile seal has been removed. A second check that the integrity of the IV additive solution has not been tampered with is to check the polystyrene disk 50 for any puncture marks to indicate a drug may have been added after the container left the Pharmacy department. Once the sealing cover 10 has been removed, a nurse may insert an IV spike of an IV administration set through the rubber membrane 26 and complete the connection through plastic tubing to an intravenous catheter inserted into the vein of the patient.

FIG. 8 illustrates another embodiment of the present invention, a sealing cover 60 made from a single layer of foil film 62. The sealing cover 60 includes a generally circular cover area 61 joined to a pull-tab section 63. The single layer of foil film 62 may be formed from a sheet of foil-type material, such as aluminum foil tempered as dead soft, half hard or full hard foil. One possible choice of material is a dead soft aluminum foil with a thickness of 0.00035 to 0.003 inches. The foil film 62 may include indicia described above for sealing cover 10 to designate the type of additive in the IV solution or special handling requirements, e.g., whether or not the IV solution container needs to be refrigerated. A pair of generally T-shaped slits 64 may be provided near the edges of the sealing area of the cover 60 to promote its tearing and separation, similar to the slits 20 described hereinabove. Of course, slits 64 may be of any other suitable configuration, such as a slit along the tear line or multiple slits aligned along the tear line.

FIG. 9 is a bottom view of the sealing cover 60 illustrated in FIG. 8. The bottom surface of the sealing cover 60 includes an adhesive layer 68 for providing sealing engagement with the IV solution container. An adhesive free area 70 of the bottom of the sealing cover 60 is maintained for the top of the IV solution bottle or plastic bag which should be kept separate from the adhesive layer 68. The adhesive free area 70 may be formed on the bottom surface of sealing cover 60 by covering the surface with a disk, such as plastic disk 50 illustrated in FIGS. 4 and 5 and described hereinabove. Of course, the adhesive free area 70 may also be formed by other means described above for sealing cover 10, such as by applying a layer of chemical sealant, such as an ink or lacquer material, or patterning the adhesive layer 68 to keep it from contacting the rubber membrane covering the IV solution container. The pull-tab region 63 of the sealing cover 60 may also include a plastic disk 72 for forming a more rigid pull-tab and for sealing off the adhesive material which may apply to the pull-tab region of the tab. As noted for the adhesive free region 70, the bottom surface of the pull-tab section 63 also may be coated with a chemical sealant or patterned printing of the adhesive to keep the adhesive layer 68 from contact with the pull-tab region 63.

Figure 10:
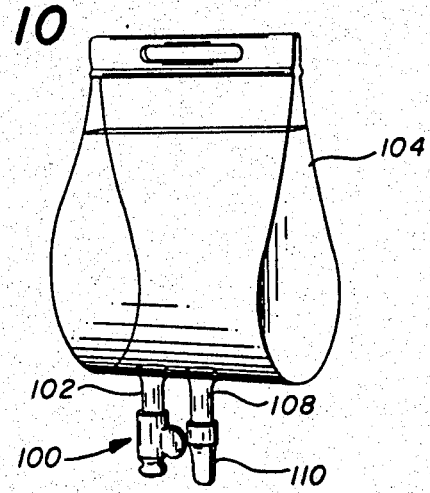
FIG. 10 is a perspective view of a plastic IV solution container closed with another embodiment of a sealing cover of the present invention.

FIG. 10 illustrates yet another embodiment of the present invention, a sealing cover 100 wrapped about the inlet port 102 of a plastic IV bag 104. The inlet port 102 has a rubber plug 106, as shown in FIG. 13A, through which an IV additive is introduced into the solution in the IV bag 104. A discharge port 108 through which the solution is administered to the patient is closed by a sterile cover 110. The sealing cover 100 serves several functions: (1) it keeps the IV bag 104 from being double dosed once the Pharmacy department has injected the medication, (2) it keeps the inlet injection site plug 106 from being dislodged in storage, transit or handling, (3) it keeps bacteria from entering the punctured plug 106, (4) it allows the Pharmacy to salvage expensive drugs if the IV bag 104 is returned and (5) it alerts the nursing staff that if it is missing the contents may have been altered.

Figure 11:
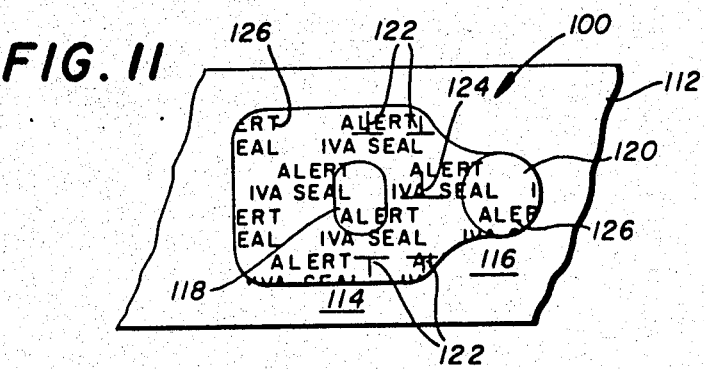
FIG. 11 is a top view of the sealing cover illustrated in FIG. 10 positioned on a strip of specially coated carrier liner.

FIG. 11 illustrates the sealing cover 100 for the plastic IV bag 104 as it might be packaged on a section of specially coated carrier paper 112. The sealing cover 100 includes a sealing area 114 and a pull-tab area 116. The sealing area 114 includes an inlet stopper protective tab 118 and a pull-tab disk 120 in the area of the pull-tab section 116. More than one tab 118 may be used to protect the plug 106 and facilitate emplacement of the cover 100 on the port 102. Generally T-shaped slits 122 are formed along the edge of the sealing area 114. The slits 122 serve to promote the tearing and separation of the sealing cover 100 in a similar manner to the slits 20 in sealing cover 10 and the slits 64 in sealing cover 60 described hereinabove. An additional T-shaped slit 124 may be provided in the central area of the sealing area 114 to further promote the destruction of cover 100 upon its removal from the inlet port 102 and to prevent its further use. Identifying information 126 may be printed on the sealing cover 100 as described above or other color coded indicia may be used as described above for sealing cover 10 to provide information to the hospital staff.

Figure 12:
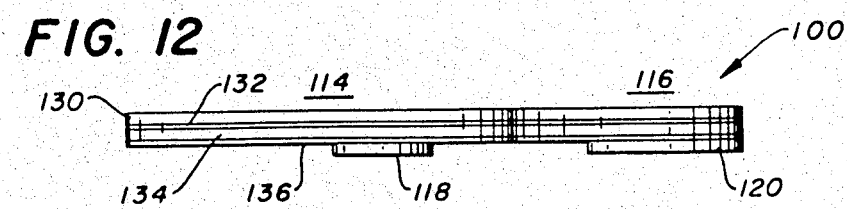
FIG. 12 is an enlarged side view of the sealing cover shown in FIG. 11.

FIG. 12 is an enlarged side view illustrating the lamination of plastic and foil layers and bonding systems of the preferred embodiment of sealing cover 100. Of course, the sealing cover 100 may also be constructed from a single layer of foil film, such as the sealing cover 60 illustrated in FIGS. 8 and 9 and described hereinabove. A bacteria and moisture proof first layer 130 of the cover 100 may be formed from a flexible thermosetting plastic film, such as polypropylene, polystyrene, polyester or polyethylene material. The first layer 130 may be imprinted with a message 126 which could provide information concerning the IV additive solution as well as aid visibility of the telltale strips left upon the neck of the inlet port 102. A layer of adhesive material 132 joins the first layer 130 to a second layer 134 of foil film. The second layer 134 of foil film has the desired characteristics to provide a flexible sterile seal, yet it promotes the separation of cover 100 when pulled in one direction when removed from the plastic IV bag 104 and it retains its shape when placed upon the inlet port 102. As described above for sealing cover 10, the first layer 130 of sealing cover 100 may be the foil film layer and the second layer 134 may be the layer of plastic film. The thickness of the first and second layer 130 and 134 are within the same ranges set forth above in the description of FIGS. 4 and 5.

A second layer of adhesive material 136 is applied to the surface of the second layer 134 to adhere to the carrier paper 112 and the neck of the inlet port 102 to seal the IV bag 104. In order to prevent the adhesive material 136 from contacting the "target area" of a rubber plug 106 so as not to dislodge the plug 106 open removal of seal, a "target area" disk 118 is bonded to the adhesive layer 136. The "target area" disk 118 also defines a position for proper alignment of the sealing cover 100 prior to its placement on the inlet port 102. The disk 118 may be made of polystyrene, polypropylene or other plastic material and coated with a release material to promote separation from the carrier liner 112. Similarly, a disk 120 is bonded to the adhesive 136 in the pull-tab region 116 to keep the adhesive material 136 covered. In another embodiment of the sealing cover 100, a chemical sealant, such as an ink or lacquer material, may be applied to the adhesive layer 136 to provide the "target area" disk 118 and pull-tab 120.

FIGS. 13A-D illustrate the placement of a sealing cover 100 around the inlet port 102 of the plastic IV bag 104. FIG. 13A illustrates sealing cover 100 removed from its carrier liner 112 and aligned with the target area disk 118 adjacent the rubber plug 106 of the inlet port 102. As illustrated in FIG. 13B, the edge of the sealing area 114 distal from the pull-tab region 116 is wrapped tightly about the stem of the inlet port 102 in the direction indicated by the arrow 140. As illustrated in FIG. 13C, pull-tab section 116 is tightly wrapped around the stem of inlet port 102 in the direction indicated by the arrow 142, wrapping the seal 100 about itself to surround the neck of the inlet port 102. As illustrated in FIG. 13D, the final step in sealing the inlet port 102 is to close the sealing cover 100 upon itself by pinching the area 144 of the sealing area 114 extending beyond the end of the rubber plug 106.

FIGS. 14A-B illustrate the steps in removing the sealing cover 100 from the inlet port 102. Pull-tab 116 is pulled in the direction indicated by the arrow 146 to initiate tearing of the sealing area 114, promoted by the slits 122. As illustrated in FIG. 14, when the seal 100 is removed a narrow band of material 148 is left around the neck of the inlet port 102 to indicate that a seal applied in the Pharmacy department of the hospital has been removed.

Figure 15:
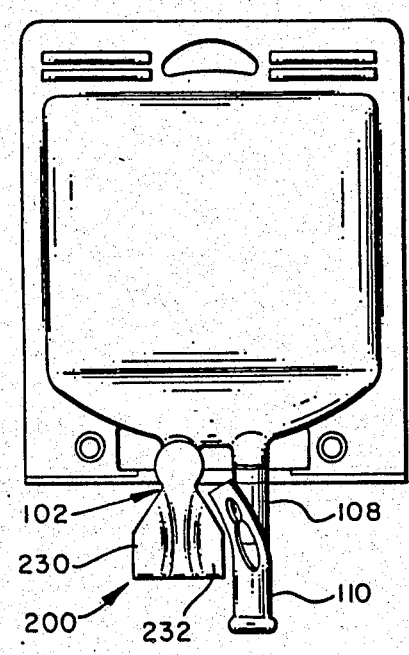
FIG. 15 is a perspective view of a plastic IV solution container closed with another embodiment of a sealing cover of the present invention.
Figure 16:
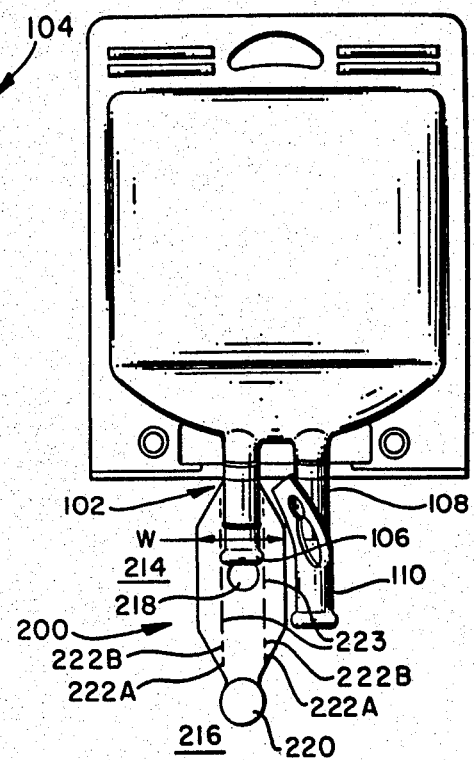
FIG. 16 is a perspective view of the alternate embodiment of the sealing cover of FIG. 15 shown placed under the inlet port of the IV solution container before closure.
Figure 17:
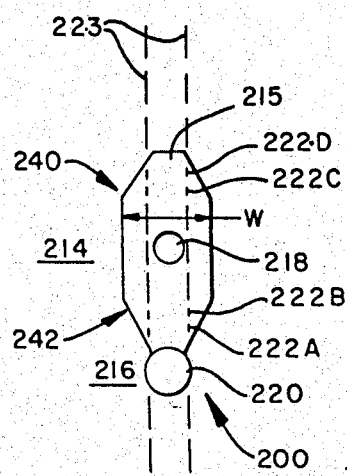
FIG. 17 is a plan view of the reverse side of the sealing cover illustrated in FIGS. 15 and 16.

FIGS. 15-17 illustrate yet another embodiment of the present invention, a sealing cover 200 folded lengthwise over the opening of the inlet port 102 of a plastic bag container 104. The inlet port 102 has a rubber plug 106 through which an IV additive is introduced into the solution of the IV bag 104. A discharge port 108 through which the solution is administered to the patient is closed by a sterile cover 110. The sealing cover 200 serves several functions: (1) it keeps the IV bag 104 from being double dosed at the nursing station or in the Pharmacy once the Pharmacy department has injected a prescribed medication, (2) it keeps the plug 106 from becoming dislodged in storage, transit or handling, (3) it reduces the possibility of bacteria entering the IV bag 104 if the plug 106 is dislodged, (4) it allows the Pharmacy department to salvage expensive drugs, such as used in chemotherapy, if the IV bag 104 is returned with the seal 200 in tact, and (5) it alerts the nursing staff that the contents may have been altered if the sealing cover 200 is missing.

As illustrated in FIG. 17, the sealing cover 200 includes a sealing area 214 and a pull-tab area 216. The sealing area 214 has a layer of adhesive material 215 to attach the cover to a carrier liner (not shown) and to attach the cover 200 to a container top in a similar manner to cover 100 as illustrated in FIG. 11 and described above. The adhesive layer 215 may include a non-adhesive region 218 for alignment with the rubber plug 106, as illustrated in FIG. 16. The non-adhesive region 218 may be formed from a disk coated with a release material or from treating a region of area 214 with an adhesive sealant, such as ink or lacquer. Of course, in some applications it may not be necessary to include the non-adhesive region 218. A nonadhesive region 220 is formed on the reverse side of the pull-tab 216 to facilitate placement of the cover 200 on the inlet port 102. Slits 222 are formed along the edge of the sealing area 214 near the pull-tab section 216 and near the opposite end of the cover area 214 to define tear lines 223. The slits 222 promote the tearing and separation of sealing cover 200 in a similar manner to slits 122 in cover 100, slits 64 in cover 60, and slits 20 in sealing cover 10. The slits 222A, 222B, 222C and 222D may be eliminated or replaced with other suitable arrangements of slits, such as a single slit (on one or both sides of pull-tab section 216) or "T-shaped" slits, like slits 20 of cover 10.

Figure 18:
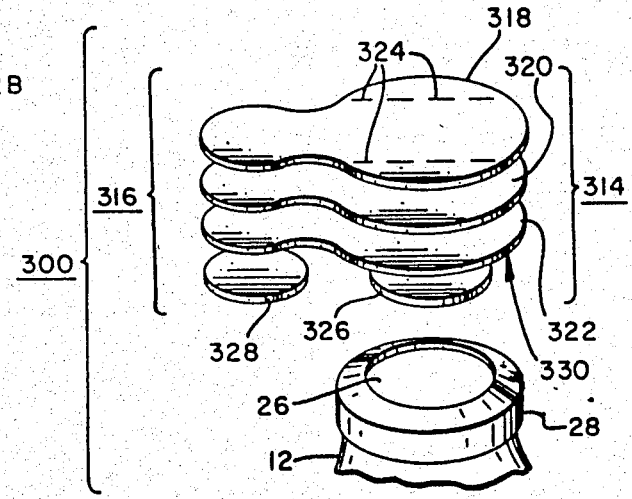
FIG. 18 is an enlarged exploded view of the laminated structure of a sealing cover of an alternate embodiment of the present invention.

The flexible sealing cover 200 is constructed from layers of plastic and metal foil films as illustrated in FIGS. 5, 12 and 18 for covers 10, 100 and 300 and described herein. The sealing cover 200 may also be constructed from a single layer of metal foil film as cover 60 illustrated in FIG. 8 and described hereinabove.

The sealing cover 200 can be wrapped about an inlet port 102 in the manner illustrated in FIGS. 13A-D and described above. The sealing cover 200 may also be applied by folding the cover 200 over the inlet port as illustrated in FIGS. 15 and 16. The sealing cover 200 is of a width "W" at least greater than the diameter of the inlet port 102 for mating opposing surfaces of sealing area 214 for providing a seal area 230 and 232 on opposite sides of the inlet port 102. The ends 240 and 242 of sealing cover 200 taper towards the center of the sealing cover 200 to provide clearance from contacting the edge of bag 104 and to facilitate the placement of the cover 200.

FIG. 18 illustrates yet another embodiment of the sealing cover of the present invention, a sealing cover 300. The cover 300 is shown aligned with an IV solution container 12 above the target area 26 of the container top metal rim 28. The sealing cover 300 includes a sealing or cover area 314 joined to a pull-tab area 316 for affixing and removing the cover 300.

The sealing cover 300 includes three layers of material: a first layer 318 of plastic film, a second layer 320 of plastically deformable film, and a third layer 322 of plastic film. The multiple layers 318, 320 and 322 may be joined together with intervening layers of adhesive material or bonded by extruding the plastic layers 318 and 322 onto the foil film layer 320. The layers 318, 320 and 322 are impermeable to moisture and bacteria to retain the sterility of the resealed container 12. The first and third layers 318 and 322 may be formed from a thermosetting plastic, such as polypropylene, polystyrene, polyester or polyethylene, and the film is of a thickness of between 0.00025 and 0.003 inches. The second layer may be formed from aluminum foil film also having a thickness of between 0.00025 and 0.003 inches and from dead soft, half hard or full hard foils.

The sealing cover 300 may include printing as described above for sealing cover 10 as indicia relating to the container to which the cover 300 is applied. The sealing cover 300, as well as seals 10, 100 and 200, may also have a plain surface without any visible printing to prevent tampering with contents of the container from a needle puncturing the seal cover 300.

The lamination of materials of sealing cover 300 provides a flexible seal for conforming to the top of the container 12, yet a seal with enough stiffness to inhibit curling back upon itself when the cover is removed from a strip of carrier liner. Slits 324 are formed in the cover 300 for promoting separation of the cover 300 along a tear line coincident with slits 324 when the cover 300 is removed from the container 12 by raising the pull-tab section 316. The slits 324 may extend across the cover area 314, as illustrated, or extend only partially across this area, as illustrated in FIG. 17 for cover 200. The separation of the cover 300 upon removal causes telltale strips of material to be left in engagement with the rim 28, as telltale strips 30 and 32 shown in FIG. 2.

A layer of adhesive material 330 is applied to the surface of the third layer 322 which adheres to a carrier liner in packaging and engages the container top metal rim 28 in sealing container 12. The disk 326 provides a means for separating the adhesive material 330 from the rubber membrane "target area" 26 of the container 12. A second disk 328 provides an adhesive free region in the pull-tab region 316 to allow the cover 300 to be gripped for removal from the carrier liner, placement on the container 12 and removal from the container 12. The disks 326 and 328 may be made from a polystyrene material. Of course, the adhesive free regions may be formed by other means, such as those described above by applying an adhesive sealant to the adhesive material 330 or patterning the adhesive material 330 to provide the desired adhesive free regions.

Although the preferred embodiments of the invention have been illustrated in the accompanying drawings and described in the foregoing Detailed Description, it will be understood that the invention is not limiited to the embodiments disclosed, but is capable of numerous rearrangements, modifications and substitutions of parts and elements without departing from the spirit of the invention. In addition to its use as a sterile reclosure seal, the sealing covers 10, 60, 100, 200 and 300 may also be used on container tops as security seals. Whether or not the seal cover serves to maintain the sterility of a container, it may also serve as a means for indicating that a container seal has been broken by use of telltale strips when the cover is removed.

I claim:

1. A flexible sealing cover for resealing a port of a pharmaceutical container, comprising:
   a layer of flexible film forming a cover region of the sealing cover and being substantially impervious to moisture and bacteria, said film being plastically deformable under stress;
   a pull tab region extending from said cover region;
   an area of adhesive material bonded to a major surface of said layer of flexible film for providing an adhesive surface of the cover and pull tab regions;
   means forming a first non-adhesive region within said area of adhesive material of said cover region and a second non-adhesive region within said area of adhesive material of said pull tab region; and
   means for tamper proofing the seal whereby the seal is destroyed upon removal from the port of the container, thereby leaving a telltale strip of material on the port of the container and preventing reuse of the seal.

2. The flexible sealing cover of claim 1, wherein said flexible film is a metallic foil.

3. The flexible sealing cover of claim 2, wherein said metallic foil is an aluminum foil.

4. The flexible sealing cover of claim 2, wherein said metallic foil is a dead soft foil.

5. The flexible sealing cover of claim 1, wherein said means forming a first non-adhesive region is a disk positioned in the central region of the area of adhesive material of said cover region and a second non-adhesive region is a disk positioned on the area of adhesive material of said pull tab region, whereb said first non-adhesive region is positioned to cover the port of the container and said second non-adhesive region allows the sealing cover to be handled without touching adhesive material.

6. The flexible sealing cover of claim 1, wherein said means forming the first and second non-adhesive regions is an adhesive sealant applied to the surface of said adhesive material.

7. The flexible sealing cover of claim 1, wherein said means forming the first and second non-adhesive regions is a predetermined pattern of adhesive material printed on said layer of film whereby no adhesive material is bonded to said layer of film in said first and second non-adhesive regions.

8. The flexible sealing cover of claim 1, wherein said means for leaving a telltale strip of said layer of film is at least one slit in said layer of film to promote the tearing of said layer upon removal from the container.

9. The flexible sealing cover of claim 1, wherein said means for tamper-proofing the seal is a first set of slits in said cover region proximate said pull-tab region and a second set of slits in said cover region distal said pull-tab region whereby the seal self-destructs when removed from the port of the container by said pull-tab or by said cover region.

* * * * *

UNITED STATES PATENT AND TRADEMARK OFFICE
CERTIFICATE OF CORRECTION

PATENT NO. : 4,527,703
DATED : July 9, 1985
INVENTOR(S) : Robert Cummings

It is certified that error appears in the above-identified patent and that said Letters Patent is hereby corrected as shown below:

Column 3, line 19, change "tamper proof" to --tamperproof--.

Column 13, line 37, after "not" change "the" to --a--.

Column 14, line 24, change "whereb" to --whereby--.

Signed and Sealed this

Nineteenth Day of November 1985

[SEAL]

Attest:

Attesting Officer

DONALD J. QUIGG

Commissioner of Patents and Trademarks